United States Patent [19]

Mischler et al.

[11] Patent Number: 5,549,462
[45] Date of Patent: Aug. 27, 1996

[54] GEAR PUMP AND ITS USES

[75] Inventors: Eduard Mischler, Regensdorf; Roger Stehr, Bülach, both of Switzerland

[73] Assignee: Maag Pump Systems AG, Zurich, Switzerland

[21] Appl. No.: 140,397

[22] Filed: Oct. 25, 1993

[30] Foreign Application Priority Data

Oct. 23, 1992 [CH] Switzerland .................. 03 304/92

[51] Int. Cl.$^6$ .................................................. F01C 19/00
[52] U.S. Cl. ...................... 418/1; 418/83; 418/141; 418/179; 418/206.6; 384/565
[58] Field of Search .................. 418/1, 171, 179, 418/205, 206, 83; 384/565, 569, 907.1, 912, 919

[56] References Cited

U.S. PATENT DOCUMENTS

| | | |
|---|---|---|
| 1,370,923 | 3/1920 | Slater . |
| 1,798,797 | 6/1929 | Jones et al. . |
| 2,679,412 | 3/1950 | Whitfield . |
| 3,131,643 | 5/1964 | Marietta . |
| 3,133,506 | 5/1964 | Luciani . |
| 3,156,191 | 11/1964 | Lauck . |
| 3,172,366 | 3/1965 | Laumont . |
| 3,309,997 | 6/1965 | Kita . |
| 3,473,474 | 11/1967 | Martinaglia . |
| 3,512,906 | 4/1968 | Molly . |
| 3,704,968 | 12/1972 | Haupt .................. 418/206 |
| 3,746,481 | 7/1973 | Schippers .............. 418/206 |
| 3,830,602 | 8/1974 | Boop et al. ............ 418/131 |
| 4,134,713 | 1/1979 | Binaut . |
| 4,336,213 | 6/1982 | Fox . |
| 4,634,300 | 1/1987 | Takebayashi et al. ... 384/569 |
| 4,906,110 | 3/1990 | Van Wyk et al. ....... 384/565 |
| 5,228,786 | 7/1993 | Tanimoto et al. ....... 384/907.1 |

FOREIGN PATENT DOCUMENTS

| | | |
|---|---|---|
| 0028061 | 5/1981 | European Pat. Off. . |
| 0158901 | 10/1985 | European Pat. Off. . |
| 0509218 | 10/1992 | European Pat. Off. . |
| 0535295 | 4/1993 | European Pat. Off. . |
| 3922720 | 1/1990 | Germany . |
| 90111567 | 11/1990 | Germany . |
| 4125128 | 2/1992 | Germany . |
| 0220719 | 9/1989 | Japan ................ 384/565 |
| 0220718 | 9/1989 | Japan ................ 384/565 |

OTHER PUBLICATIONS

"Stahlschlüssl", C. W. Wegst, Verlag Stahlschüssel Wegst GmbH, 1992.
"Introduction To Materials Science For Engineers", by James F. Shackelford, pp. 2–6, Macmillan Publishing Co., 1985.

Primary Examiner—Charles Freay
Attorney, Agent, or Firm—Evenson McKeown Edwards & Lenahan, PLLC

[57] ABSTRACT

A gear pump comprises rotors disposed in roller bearings. For the delivery of very viscous polymer meltings, bearings surfaces of at least one of inner races, outer races of the bearings and bearing surfaces of roller elements are made of a steel with a high-temperature stability. Bearing takes place on material pairings consisting of one of S6-5-2 high-speed steel and silicon nitride $Si_3N_4$. The roller bearings are either unlubricated or lubricated by a lubricant remaining in the bearing, preferably a solid-substance lubrication. A distance of supported shafts, from a gearwheel face to a supporting area of the shafts, determined by the outer contact point in the roller bearing, is smaller than twice the median diameter of the shafts therealong.

33 Claims, 1 Drawing Sheet

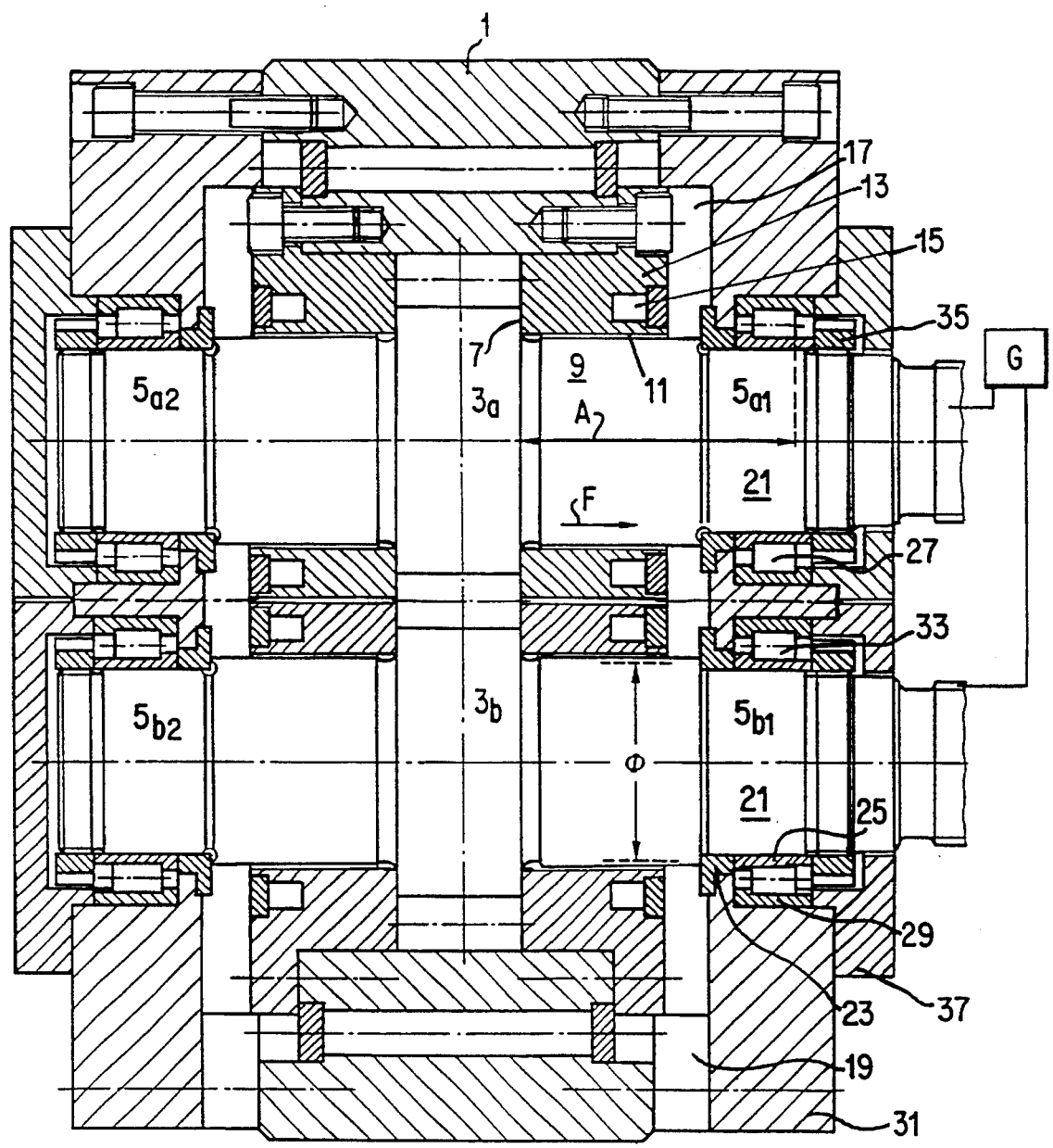

GEAR PUMP AND ITS USES

BACKGROUND AND SUMMARY OF THE INVENTION

The present invention relates to a gear pump comprising rotors disposed in roller bearings and its uses.

For compressors, fans, and pumps, particularly screw-type pumps, it is known from U.S. Pat. No. 2,679,412 to support the shaft by means of roller bearings. Between an inner race and a shaft collar on which a pump rotor is supported, an oil throw-off ring arranged directly next to the bearing, a spacer bush, and a sealing counterring, which rests against the shaft collar, are arranged and are clamped together with the inner race to form a subassembly which rotates together with the shaft.

In a bearing housing and sealing housing which encloses this subassembly, two sliding rings are arranged with the same axes between the roller bearing and the sealing counterring and, stressed by springs supported on the housing, rest against the face of the counter ring facing away from the pump rotor. The two sliding rings bound a ring-shaped space, a lubricating fluid pipe leading into this ring-shaped space.

Furthermore, the use of roller bearings for gear pumps is known per se, in which case reference is made, for example, to the following U.S. Patent Documents:

| 3 | 309 | 997 |
|---|-----|-----|
| 3 | 131 | 643 |
| 3 | 133 | 506 |
| 3 | 512 | 906 |
| 1 | 370 | 923 |
| 1 | 798 | 797 |
| 4 | 134 | 713 |
| 3 | 473 | 474 |
| 3 | 156 | 191 |
| 3 | 172 | 366 |

Pumps of this type may be used for the delivery of media at room temperature as well as, as known, for example, from the EP-A 535 295 which was published later, for the delivery of caoutchouc, which takes place at temperatures of from 90° C. to 120° C.

On the whole, the use of externally lubricated roller bearings for the pump rotors has the important advantage that the bearing of the shaft takes place completely independently of the lubricating characteristics of the delivered polymer. Naturally, this requires an absolute separation of roller bearings and delivered media. In addition, roller bearings arranged outside the delivered flow are much more easily accessible for maintenance and servicing purposes than slide bearings situated in the flow of the molten mass, where a demounting is possible only in the hot condition.

It is an object of the present invention to further develop pumps of the initially mentioned type for the delivery of media at high temperatures and to be able to utilize the above-mentioned advantages also in the case of such a use.

For gear pumps, specifically gear pumps which deliver very viscous fluids, such as polymer meltings with differential pressures in the order of up to approximately 500 bar at temperatures >200° C., it has so far been customary to dispose the rotor shafts in slide bearings lubricated by the media.

The above-mentioned object is achieved by the further development of the initially mentioned pump by providing that, for the delivery of very viscous polymer meltings, bearings surfaces of at least one of inner races, outer races of the bearings and bearing surfaces of roller elements are made of a steel with a high-temperature stability.

In contrast to screw-type pumps, in the case of gear pumps, the largest shaft diameter is, as a rule, smaller than the diameter of the root of the tooth of the medium-delivering gearwheels. From this point of view, the inherent stiffness of the shafts is limited. However, any bending of the shafts has the result that the contact conditions of the mating medium-delivering gearwheels as well as the effect of provided shaft sealing devices will be impaired, whereby the service life of the gearwheels and of the shaft bearings will be reduced.

It is therefore particularly astonishing that the arrangement and construction of the bearing according to the invention makes it easily possible to absorb, by means of rotor shafts supported in roller bearings, the above-mentioned stress caused by pressure and particularly also by temperature.

This relates particularly to the delivery of very viscous abrasive media, as, for example, represented by highly filled polymer meltings. In the case of such delivery media and differential pressure of up to 500 bar, a slide bearing lubricated by a delivered medium is subjected to wear which is no longer acceptable economically. A bearing is provided according to the invention which is completely independent of the lubricating characteristics of the delivered polymer. The reason is that the provided roller bearings no longer come in contact with the delivered medium but are lubricated.

In contrast to the customary bearing technology for gear pump rotors, the use of roller bearings is therefore suggested for the above-mentioned rotor shafts. These roller bearings do not come in contact with the delivered medium itself. This permits in an economical manner the use of the gear pump for very viscous abrasive media, such as highly filled polymer meltings.

While it is taken-into account that the temperatures of the melting may be above 300° C., the bearing according to the invention results in economical service lives.

Preferably, the bearing material in the form of S6-5-2 high speed steel or ceramic material such as silicon nitride ($Si_3N_4$) will be used.

In particular, as mentioned above, no external lubricating medium circulating system is provided, but the roller bearings are not lubricated or are lubricated only by lubricant remaining in the bearing. Preferably, a solid-substance lubrication is provided.

Furthermore, in order to minimize the bending of the shafts, the distance between the gearwheel faces and the supporting area of the shaft, determined by the outer contact point in the roller bearing, can be dimensioned to be shorter than determined by twice the median diameter of the shafts along this course.

In particular, when using the gear pump according to the invention for the delivery of a very abrasive delivered medium, such as highly filled plastic masses, one labyrinth seal respectively can be provided between the roller bearing and the gearwheels. As a result, it is prevented, specifically by means of sealing devices, which do not increase the number of components to be provided on the bearing, that delivered medium penetrates from the delivery space into the roller bearings.

Furthermore, as a result of the fact that the labyrinth seals can be tempered by a heat transport medium, the possibility is created to optimize its sealing effect, while taking into account the alternating thermal stress, as caused, for example, by different operating points of the gear pump.

With respect to the construction and the effect of the above-mentioned labyrinth seals, reference is made to "Hydrodynamic Seal for Rotating Shafts", Prof. ret. E. F. Bohn, et al., *Chemie-Ingenieur-Technik,* 31st Year, 1959, Page 202, an on., as well as to U.S. Pat. No. 4,336,213.

Furthermore, the effect of the labyrinth seal in which the delivery device points from the gearwheels toward the roller bearings is preferred.

A further measure for preventing that delivered medium enters into the roller bearings is implemented by providing, between sealing devices and the roller bearings, an annular gap about the shaft so that possible delivered medium particles penetrating through the seal will fall to the outside through an opening of the gap provided for this purpose.

In the case of such a pump, both pump shafts can be driven separately, for example, by way of an external distributor gear, or only one of the rotors will be driven.

This type of a gear pump according to the invention is particularly suitable for very viscous abrasive media, as represented, for example, by highly filled polymer meltings. Customary fillers and reinforcing materials in this case are, among others, glass fibers, carbon fibers as well as minerals, such as silica sand, ground slate or chalk.

BRIEF DESCRIPTION OF THE DRAWING

In the following, the invention will be explained by means of a figure.

This FIGURE is a schematic longitudinal sectional view of a gear pump.

DETAILED DESCRIPTION OF THE DRAWING

In a pump housing 1, two gearwheels $3_a$ and $3_b$ are disposed on two sides respectively on shafts $5_{a1}$, $5_{a2}$ and $5_{b1}$ and $5_{b2}$. The shafts and the gearwheel form the rotor.

Since, according to the illustrated embodiment, all rotor shafts are supported in an identical manner, only one shaft with its bearing will be described in the following.

By means of its large-diameter section 9 which is closest to the gearwheel, the shaft $5_{a1}$ runs through a labyrinth seal 11 which is constructed in a known manner and whose delivery effect, as known, for example, from the above-mentioned article "Hydrodynamic Seal", as indicated by means of F, preferably points away from the gearwheel $3_a$.

The labyrinth seal block 13 has a duct or pipe system 15 for a heat transport medium. As a result, the temperature can be influenced in the area of the labyrinth seal 11.

Extending in the axial direction from the seal 11 to the outside, an annular gap 17, following the labyrinth seal block 13, reaches around the large-diameter shaft section 9. The annular gaps 17 of rotor shafts $5_a$, $5_b$, which are disposed above one another, communicate, and a fall-out opening 19 is provided which projects downward. Delivered medium, which penetrates through the labyrinth seal 11 axially to the outside, will fall out through the annular gap 17 and farther through opening 19 before it can reach the area of the shaft bearing which will be described in the following.

On the one side, a spacer sleeve 23 which is followed by the inner race 25 of a roller bearing 27 is mounted on the shaft section 21, opposite section 9 with the reduced diameter, which follows the gap 17. The outer race 29 of the roller bearing 27 is fixed in the pump cover 31. Roller elements in the form of bearing cylinders 33 or possibly in the form of bearing balls support the shaft section 21 on the pump cover 31.

For the axial fixing of the inner race 25 on the shaft $5_a$, a shaft nut 35 is screwed on in an axially connecting manner. Finally, the complete roller bearing 27 is closed off toward the outside by a bearing cover 37.

The bearing surfaces of the inner race 25 and/or the outer race 29 of the bearing and/or of the roller elements 33, preferably all bearing surfaces, consist of a steel of high temperature stability, as, for example, of a high-speed steel S6-5-2 or preferably of a ceramic material, such as silicon nitride $Si_3N_4$.

In particular, in the case of this embodiment with ceramic bearing surfaces, an external lubricating medium circulating system to bearing 27 is omitted. Preferably, a solid-substance lubrication is provided.

Furthermore, for minimizing the bending of the shaft, the distance A between the gearwheel face and the supporting area of the shaft—given by the outer contact point in the roller bearing, is selected to be smaller than twice the median shaft diameter Φ entered in the FIGURE by an interrupted line.

The illustrated gear pump according to the invention with the bearing arrangement according to the invention is particularly suitable for the delivery of very viscous abrasive media, as represented by highly filled polymer meltings. In this case, both rotors may be driven separately by way of an external distributing gear, which is shown schematically at G, or only one of the rotors may be driven.

Thus, one pump may be used in the temperature range of room temperatures of up to above 200° C. and even up to above 300° C.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A gear pump comprising a gear pump rotor including a gear pump gear-wheel fixed to a rotor shaft, a roller bearing assembly rotatably supporting the rotor shaft at a position spaced from an end-face of the gear wheel, said roller bearing assembly including roller elements having bearing surfaces, an inner race with inner race surfaces engaging the roller element bearing surfaces, and an outer race with outer race surfaces engaging the roller element bearing surfaces, wherein the end-face of the gear wheel is spaced from an axially outermost bearing area of engagement of the race surfaces with the roller elements by a distance which is smaller than twice the median diameter of a section of the shaft intermediate the gear wheel and end-face and the roller bearing assembly, a sealing device sealingly engaging the shaft between said gear wheel end-face and said roller bearing assembly, wherein an annular gap is provided around the shaft at a location between the sealing device and the roller bearing assembly, and a pipe system for a heat-transport medium adjacent said sealing device and between said annular gap and said gear wheel end face.

2. A gear pump arrangement comprising:

a gear pump rotor including a gear wheel fixed to a gear pump shaft, a first roller bearing assembly rotatably supporting the gear pump shaft at a position spaced from a first axial end face of the gear wheel, said roller bearing assembly including roller elements having bearing surfaces, an inner race with inner race surfaces engaging the roller element bearing surfaces and an outer race with outer race surfaces engaging the roller element bearing surfaces, at least one of the race surfaces and of the roller element surfaces being formed of one of high-speed steel material and of ceramic material, a labyrinth seal sealingly engaging the shaft between said axial end face of the gearwheel and the roller bearing assembly, and an annular gap provided around the shaft at a location between the labyrinth seal and the roller bearing assembly.

3. A gear pump arrangement according to claim 2, wherein the first axial end face of the gear wheel is spaced from an axially outermost bearing area of engagement of the race surfaces with the roller elements by a distance which is smaller than twice the median diameter of a section of the shaft intermediate the gear wheel and the first roller bearing assembly.

4. A gear pump arrangement according to claim 2, wherein said annular gap is configured as a collecting space which is downwardly open and serves to collect medium being pumped which penetrates the seal.

5. A gear pump arrangement according to claim 2, wherein said at least one of the race surfaces and of the roller element surfaces is formed of S6-5-2 high-speed steel.

6. A gear pump arrangement according to claim 2, wherein said at least one of the race surfaces and of the roller element surfaces is formed of silicon nitride ceramic material.

7. A gear pump arrangement according to claim 2, wherein said roller elements are lubricated by a solid lubricant.

8. A gear pump arrangement according to claim 2, wherein said roller elements are unlubricated.

9. A gear pump arrangement according to claim 2, wherein one of two of said bearing surfaces and race surfaces contacting each other is made of high-speed steel and the other is made of silicon nitride.

10. A gear pump arrangement according to claim 2, comprising a second roller bearing assembly rotatably supporting the gear pump shaft at an axial side of the gear wheel opposite the first roller bearing assembly.

11. A gear pump arrangement according to claim 10, wherein said second roller bearing assembly is configured similarly to the first roller bearing assembly.

12. A gear pump arrangement according to claim 10, wherein said shaft is driven by an external distributing gear.

13. A gear pump arrangement according to claim 2, comprising a plurality of said gear pump rotors with similar roller bearing assemblies.

14. A gear pump arrangement according to claim 10, comprising a plurality of said gear pump rotors with similar roller bearing assemblies.

15. A gear pump arrangement according to claim 3, wherein said annular gap is configured as a collecting space which is downwardly open and serves to collect medium being pumped which penetrates the sealing device.

16. A gear pump arrangement according to claim 9, wherein said annular gap is configured as a collecting space which is downwardly open and serves to collect medium being pumped which penetrates the sealing device.

17. A gear pump arrangement according to claim 9, comprising a second roller bearing assembly rotatably supporting the gear pump shaft at an axial side of the gear wheel opposite the first roller bearing assembly.

18. A gear pump arrangement according to claim 17, wherein said second roller bearing assembly is configured similarly to the first roller bearing assembly.

19. A gear pump arrangement according to claim 16, comprising a second roller bearing assembly rotatably supporting the gear pump shaft at an axial side of the gear wheel opposite the first roller bearing assembly.

20. A gear pump assembly according to claim 19, wherein said second roller bearing assembly is configured similarly to the first roller bearing assembly.

21. A method of pumping highly filled polymer melting comprising the steps of:

providing a gear pump with rotors to pump said melting;

rotatably supporting said rotors in roller bearing assemblies which include roller elements having bearing surfaces, an inner race with inner race surfaces engaging the roller element bearing surfaces, and an outer race with outer race surfaces engaging the roller element bearing surfaces, providing at least one of the race surfaces and roller element bearing surfaces with one of high-speed material and of ceramic material, providing an annular gap around the shaft at a location between the labyrinth seal and the roller bearing assembly, and rotatably driving said rotors to pump said melting.

22. A method according to claim 21, wherein said highly filled polymer melting has a temperature of about 300° C. during operation of said gear pump.

23. A method according to claim 21, wherein the first axial end face of the gear wheel is spaced from an axially outermost bearing area of engagement of the race surfaces with the roller elements by a distance which is smaller than twice the median diameter of a section of the shaft intermediate the gear wheel and the first roller bearing assembly.

24. A method according to claim 21, wherein said annular gap is configured as a collecting space which is downwardly open and serves to collect medium being pumped which penetrates the seal.

25. A method according to claim 23, wherein said annular gap is configured as a collecting space which is downwardly open and serves to collect medium being pumped which penetrates the seal.

26. A method according to claim 25, wherein the first axial end face of the gear wheel is spaced from an axially outermost bearing area of engagement of the race surfaces with the roller elements by a distance which is smaller than twice the median diameter of a section of the shaft intermediate the gear wheel and the first roller bearing assembly.

27. A method according to claim 21, wherein said at least one of the race surfaces and of the roller element surfaces is formed of S6-5-2 high-speed steel.

28. A method according to claim 21, wherein said at least one of the race surfaces and of the roller element surfaces is formed of silicon nitride ceramic material.

29. A method according to claim 21, wherein said at least one of the race surfaces and of the roller element surfaces is formed of silicon nitride ceramic material.

30. A method according to claim 21, wherein one of two of said bearing surfaces and race surfaces contacting each other is made of high-speed steel and the other is made of silicon nitride.

31. A method according to claim 21, comprising providing a second roller bearing assembly rotatably supporting the gear pump shaft at an axial side of the gear wheel opposite the first roller bearing assembly.

32. A method according to claim 29, wherein said second roller bearing assembly is configured similarly to the first roller bearing assembly.

33. A method according to claim 21, comprising providing a plurality of commonly driven ones of said gear pump rotors with similar roller bearing assemblies.

* * * * *